United States Patent [19]

Weber

[11] Patent Number: 4,522,727
[45] Date of Patent: Jun. 11, 1985

[54] PROCESS FOR CONTINUOUS REMOVAL OF AMMONIACAL NITROGEN FROM AQUEOUS STREAMS

[75] Inventor: Willis W. Weber, Riverton, Wyo.

[73] Assignee: ATEC Inc., Riverton, Wyo.

[21] Appl. No.: 663,233

[22] Filed: Oct. 22, 1984

[51] Int. Cl.³ .......................... C02F 1/42; B01J 29/38
[52] U.S. Cl. .................... 210/673; 210/676; 210/681; 210/903; 502/47
[58] Field of Search ............ 210/673, 675, 676, 681, 210/903; 502/23, 38, 41, 44, 45–48, 56

[56] References Cited

U.S. PATENT DOCUMENTS

| | | | |
|---|---|---|---|
| 3,723,308 | 3/1973 | Breck | 210/681 |
| 3,929,600 | 12/1975 | Hiasa et al. | 210/681 X |
| 3,948,769 | 4/1976 | Dobbs | 210/673 |
| 3,984,313 | 10/1976 | Higgins | 210/673 X |
| 4,219,441 | 8/1980 | Noshimura et al. | 502/56 X |
| 4,344,851 | 8/1982 | Sherman et al. | 210/681 X |

*Primary Examiner*—Thomas Wyse
*Attorney, Agent, or Firm*—Dressler, Goldsmith, Shore, Sutker & Milnamow, Ltd.

[57] ABSTRACT

A continuous process for removal of ammoniacal nitrogen from water is disclosed. This process is useful for maintaining water quality in aquaculture operations, e.g., fish hatcheries and the like. A particulate stream of zeolitic ion exchange material is circulated continuously through an exchanger and a regenerator. An aqueous process stream containing ammoniacal nitrogen, e.g., ammonia, is passed through the exchanger in continuous counter current liquid-solid contact with a stream of particulate, ammoniacal nitrogen-sorbing zeolitic ion exchange material of natural or synthetic origin. A treated liquid water stream having a reduced ammoniacal nitrogen content exits from the exchanger, as does a stream of ammoniacal nitrogen-enriched particulate zeolitic ion exchange material. The latter stream is regenerated in the regenerator at a temperature of about 350° C. to about 650° C. while an oxygen-containing gas stream, e.g., air, is passed in continuous counter current gas-solid contact therewith. Gases emanating from the regenerator are used to preheat the ammoniacal-nitrogen enriched particulate material that enters the regenerator. The regenerated stream of particulate, ammoniacal nitrogen-sorbing zeolitic ion exchange material is recycled to the exchanger.

41 Claims, 2 Drawing Figures

PROCESS FOR CONTINUOUS REMOVAL OF AMMONIACAL NITROGEN FROM AQUEOUS STREAMS

BACKGROUND OF THE INVENTION

This invention relates to purification of liquid water. In one aspect, this invention is directed to removal of ammoniacal nitrogen from aqueous streams in fish hatchery and fish culture operations.

The world's need for clean water and clean air has led to extensive investigation of the use of ion-exchange materials to remove ammoniacal nitrogen from many fluids. Zeolite ion-exchange has been widely studied, and installations are in place employing zeolites to remove deleterious ammonia from water streams. However, to simply transfer the ammonia from a fluid stream to a solid, such as a zeolite, cannot be economical unless the zeolite can be regenerated and reused. Regeneration processes that have been proposed heretofore involve release of the ammoniacal sorbate from the zeolite ion-exchanger by washing with aqueous solutions containing sodium cations with, as needed, some pH control. Such processes, at best, simply transfer the ammoniacal nitrogen from one stream to another and engender the further problems of disposal. The method of avoiding the disposal problem has generally relied on conducting the transfer of the ammoniacal nitrogen to the ion-exchanger in a manner so as to achieve highest possible concentration loading in the exchange material so that the known regeneration techniques would be feasible and effective. These considerations have led to the use of fixed bed type ion-exchange and regeneration processes.

It has now been found that one can effectively regenerate certain ion-exchange materials effectively in a thermo-chemical regeneration process at elevated temperature and in a continuous manner whereby the ammoniacal nitrogen is destroyed and the ion-exchange material is essentially ready for reuse in the sorption stage. In fact, in many applications the ammoniacal nitrogen can be used at least in part as fuel to effect regeneration.

A very important function of any water quality maintaining system in aquaculture is the removal of ammonia, the major nitrogenous excretion product of fish. Continuous exposure of fish to unionized ammonia at concentration levels of 0.5 parts per million (ppm) ammonia nitrogen with oxygen levels below 5 ppm results in a reduction of fish growth rate, damage to gill tissue (hyperplasia), and an increased susceptibility to bacterial gill disease and other tissue lesions.

The use of zeolites as ammonium ion exchangers for recirculating fish hatchery waters and in fish culture systems is known. Such use has permitted more fish to be raised in the same volume of water as in the past. As a result, biomass production has increased and the overall energy requirements of the system have been decreased. The foregoing uses are described in Pond & Mumpton, Eds., *Zeo-Agriculture*, Westview Press, Boulder, Colo., U.S.A. (1984), pp. 221-252. Also, U.S. Pat. No. 3,723,308 to Breck and U.S. Pat. No. 4,344,851 to Sherman et al. disclose zeolitic ion exchange materials suitable for aquaculture applications.

However, all such disclosed methods teach periodic, as distinguished from continuous, regeneration of the zeolitic material. Additionally, regeneration of the zeolitic material is effected with an aqueous solution of an alkaline or alkaline earth cation which reconstitutes the zeolitic material not only with respect to sorbed ammonium ions but also with respect to other cations present in the recirculating water. Thus, the normal cation balance of the involved aqueous medium, and thus its "hardness," may be undesirably disturbed.

The foregoing regeneration methods are complicated and expensive to operate on a commercial scale, however. Additionally, such regeneration methods produce a waste effluent that must be disposed of in some manner, contributing a further cost factor to the overall operation.

Moreover, in use the zeolitic ion exchange material also functions as a biofilter medium and accumulates organic debris and bacterial growth thereon, e.g., the slime bacteria *Sphaerotilus sp.*, with attendant fouling and clogging, thereby necessitating frequent, period backwash of the zeolitic ion exchange material beds.

The present invention mitigates, and in some respects obviates, the foregoing shortcomings of heretofore known systems for maintaining the quality of water in aquaculture applications.

SUMMARY OF THE INVENTION

Ammoniacal nitrogen is removed from water in a continuous process with a particulate zeolitic ion exchange material that is continuously regenerated by heating in the presence of an oxygen-containing gas. This process is useful for maintaining the quality of water in a fish hatchery, removal of ammonia from waste water, and for like applications.

Particularly, a stream of liquid water containing ammoniacal nitrogen is passed in an ion exchange zone in continuous counter current liquid-solid contact with a stream of particulate, ammoniacal nitrogen-sorbing zeolitic ion exchange material. A treated liquid water stream having a reduced ammoniacal nitrogen content and a stream of ammoniacal nitrogen-enriched particulate zeolitic ion exchange material are produced. The ammoniacal nitrogen-enriched material is recovered and an oxygen-containing gas stream is passed in continuous counter current gas-solid contact therewith while the ammoniacal nitrogen-enriched material is maintained in a heating zone at a temperature of about 350° C. to about 650° C., preferably about 375° C. to about 550° C., for a time period sufficient to provide a stream of regenerated particulate, ammoniacal nitrogen-sorbing zeolitic ion exchange material having a reduced ammoniacal nitrogen content. The regenerated material is then cooled in a cooling zone to a temperature of less than about 350° C., preferably less than about 250° C. Thereafter the cooled and regenerated material is recycled to the ion exchange zone.

The stream of the particulate, ammoniacal nitrogen-sorbing zeolitic ion exchange material has a substantially uniform particle size, which size preferably passes through a No. 4 Tyler mesh screen and is retained on a No. 8 Tyler mesh screen.

Naturally-occurring as well as synthetic zeolitic ion exchange materials that sorb ammoniacal nitrogen can be used. Preferred naturally occurring zeolitic materials are clinoptilolite, erionite, mordenite, and ferrierite. Preferred synthetic zeolitic materials are zeolite L, zeolite T, and synthetic mordenite.

DETAILED DESCRIPTION OF PREFERRED EMBODIMENTS

Definitions

As used throughout the specification and the claims, the terms below have meanings as follows:

An "ammoniacal nitrogen" is a chemical substance containing nitrogen in an oxidation state lower than that of molecular nitrogen. Some examples are ammonia, inorganic and organic derivatives of ammonia including its hydroxide, chloride and sulfate, as well as primary, secondary, tertiary alkyl ammonium compounds. Ammonium and alkyl ammonium cations of such compounds which are sorbed on zeolitic ion-exchanged material are included within the meaning of the foregoing term.

A "zeolitic ion-exchange material" is a naturally-occurring, or synthetic, crystalline material having a three-dimensional tetrahedral framework structure exemplified by $AlO_4$ and $SiO_4$, as well as $PO_4$, $GaO_4$, $FeO_4$, $GeO_4$ and like tetrahedra linked by sharing of their oxygens and having internal channels containing water and exchangeable cations. The water present in the channels can be removed and replaced without destruction of the characteristic framework structure.

The terms "sorb" and "sorption" in their various grammatical forms refer to the capture of a chemical substance by a solid from a fluid by adsorption, absorption, ion-exchange and/or chemisorption.

The term "particulate" characterizes a solid body obtained by size-reduction of a larger body of solid material or by agglomeration of finer sized solids, with or without a binder. It is known to agglomerate reactive substances and make a zeolitic ion-exchange material in situ. Such products are also termed particulates. The preferred particle size of a particulate for the process of this invention is that suitable for use in a counter current liquid-solid contactor of the moving bed type.

The term "substantially uniform" in the context of particle size characterizes particulate solids that are not segregated or segregatable by the action of the process streams under process conditions.

The value for particle "uniformity coefficient" ($C_u$) is based upon screen analysis of the particulate material and is calculated as the ratio of the sieve opening that passes 60 percent by weight of a sample to the sieve opening that passes 10 percent by weight of the sample.

The Process

The process of the present invention is a continuous process for removal of ammoniacal nitrogen from water that can be practiced in a system that includes an ion exchanger and a regenerator. A stream of a particulate zeolitic ion exchange medium is circulated continuously through the ion exchanger and the regenerator. The flow rate of the circulating zeolitic ion exchange medium can be readily regulated within design limits to meet the demand for ammoniacal nitrogen removal at any given time.

In the ion exchanger, a liquid water stream containing ammoniacal nitrogen passes in liquid-solid contact with the particulate ion exchange medium and in a direction countercurrent thereto, thus providing maximized separation efficiency, and leaves the ion exchanger depleted in ammoniacal nitrogen content. The circulating particulate zeolitic ion exchange medium leaving the ion exchanger is, of course, enriched in ammoniacal nitrogen and may carry organic debris and bacteria as well. A process vessel well suited for use as the ion-exchanger in the present system is shown in U.S. Pat. No. 3,930,685 to Milliken.

The space velocity of the liquid water feed stream through the ion exchanger, calculated as pounds of water feed per hour per pound of particulate zeolitic ion exchange medium, can range from about 0.1 to about 20 $hr^{-1}$, depending upon the ammoniacal nitrogen level in the feed stream and the desired loading of the ion exchange medium. For the maintenance of water quality in a fish culture operation, the ion exchanger space velocity typically is in the range of about 15 to about 20 $hr^{-1}$. The relevant velocity between the countercurrent liquid water stream and the particulate ion exchange material stream in the ion exchanger is maintained below the incipient particle fluidization velocity to avoid back mixing in the particulate bed.

In the regenerator, an oxygen-containing gas stream passes in gas-solid contact with particulate ion exchange medium enriched in ammoniacal nitrogen at a relative velocity with respect to the particulate medium is below the incipient fluidization velocity of the moving bed of particulate material in the regenerator while the medium is maintained at an elevated temperature of about 350° C. to about 650° C., preferably at a temperature of about 375° C. to about 550° C. In this manner not only is the sorbed ammoniacal nitrogen removed from the particulate ion-exchange medium and converted to ecologically acceptable by-products, but the elevated temperatures also burn off any retained organic material and sterilize the medium. Combustion of ammoniacal nitrogen compounds and of the retained organic material contributes heat to the regeneration process. Regenerated particulate ion-exchange medium exiting the regenerator is cooled to a temperature of less than about 350° C., preferably to a temperature less than about 250° C. The regenerator can be an elongated column or tank having the appropriate volume to accommodate the particulate ion exchange medium stream passing therethrough and provided with appropriate heating means. The regenerator typically has a length-to-diameter ratio (L/D) greater than 1. Gas velocity in the regenerator is relatively low.

The oxygen-containing gas throughput in the regenerator depends primarily upon the specific oxygen content of the gas stream and the ammoniacal nitrogen loading of the particulate ion exchange medium. The space velocity of the oxygen-containing gas stream through the regenerator, calculated as pounds of gas per hour per pound of particulate ion exchange medium in the regenerator, can be in the range of about 0.005 to about 1 $hr^{-1}$. For regeneration of a particulate ion exchange medium used for maintaining the quality of water in a fish culture operation, the regenerator space velocity typically is about 0.01 $hr^{-1}$.

Additionally, since the present regeneration technique selectively removes only the ammoniacal nitrogen-derived cations, during steady-state operation the zeolitic ion exchange medium remains saturated with respect to other cations, e.g., $Ca^{2+}$ and $Mg^{2+}$, present in the circulating water stream.

The oxygen content of the gas stream can vary in the range of about 10 percent by volume to about 90 percent by volume. Preferably the oxygen content of the gas stream is about 20 percent by volume. A convenient gas stream for the purposes of the present process is ambient air.

The ion exchange material that constitutes the circulating particulate stream is a particulate zeolite of natural or synthetic origin, hydrolytically stable at process conditions, i.e., at least to a temperature of about 350° C., and capable of sorbing ammoniacal nitrogen.

The zeolite has a pore size capable of adsorbing oxygen. The mole ratio of the tetravalent oxide constituent to the trivalent oxide constituent in the zeolite preferably is at least about 6, e.g., for a crystalline aluminosilicate the $SiO_2/Al_2O_3$ ratio is at least about 6.

Suitable naturally-occurring zeolites are clinoptilolite, mordenite, erionite and ferrierite. The naturally-occurring zeolites, as mined, usually contain a mixture of $Na^+$, $K^+$ and $Ca^{2+}$ in exchangeable positions in their structures, thus they are not necessarily pure, homoionic species. Also suitable are synthetic zeolites that are the counterparts of the aforementioned naturally-occurring zeolites. Illustrative synthetic zeolites that are suitable for the present purposes are zeolite L, zeolite T and synthetic mordenite.

The foregoing synthetic zeolites are described in U.S. Pat. No. 3,216,789 (zeolite L), U.S. Pat. No. 2,950,952 (zeolite T), and U.S. Pat. No. 3,436,174 (synthetic mordenite). Other zeolitic ion exchange materials that can be used, when in particulate form, for the purposes of this invention are wavellite, those described in U.S. Pat. No. 4,440,871, those described in British Pat. No. 1,555,928, and the like.

Particle size of the particulate ion exchange material can vary from process embodiment to process embodiment; however, in a specific process the particle size must be substantially uniform so as to avoid segregation of individual particles according to size due to fluid action on the particles as they are circulated.

From the standpoint of uniformity, particles having a uniformity coefficient ($C_u$) in the range of about 1 to about 3 are preferred. Particles with $C_u$ in the range of about 1 to about 1.5 are particularly preferred.

Typical particle sizes can be in the range of about 1 mm to about 15 mm. Preferred are particles passing through a No. 4 Tyler mesh screen (4.75 mm) and retained on No. 8 Tyler mesh screen (2.36 mm).

The density of the moving stream of particulate ion exchange material in the exchanger depends upon the solids content of the stream as well as on the specific gravity of the particulate material. Generally, the density of the moving particulate stream in the exchanger is in the range of about 70 to about 90 pounds per cubic foot.

Loading of the particulate ion exchange material with ammoniacal nitrogen can vary depending upon the nature of the water feed stream. The loading of the particulate ion exchange material can be as low as about 0.25 to 0.5 milliequivalents of ammoniacal nitrogen per gram of the ion exchange material or as high as about 2 to about 2.5 milliequivalents per gram, depending primarily upon the effective cation exchange capacity of the material, the concentration of ammoniacal nitrogen in the feed stream, and the space velocity of the feed stream.

Figure 1:
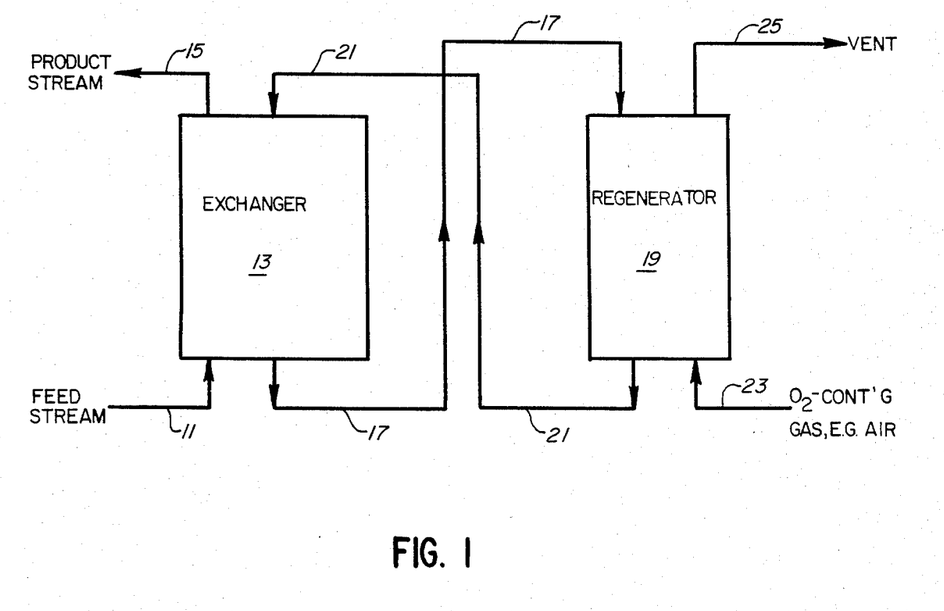
FIG. 1 is a block diagram of a continuous process embodying the present invention and showing the relationship of the principal process streams to and from an ion exchange zone and a regeneration zone.

An overall process scheme embodying the present invention is shown in FIG. 1. In particular, exchanger 13, regenerator 19, and lines 17 and 21 together constitute a process loop through which the particulate zeolitic ion exchange material is circulated. An aqueous feed stream containing ammoniacal nitrogen enters exchanger 13 through line 11, and a treated aqueous stream depleted in ammoniacal nitrogen leaves exchanger 13 via line 15.

Particulate zeolitic ion exchange material enters exchanger 13 through line 21 and moves downwardly, counter current to the upwardly flow of the aqueous feed stream, usually as a so-called moving bed. Spent particulate ion exchange material enriched in ammoniacal nitrogen exits exchanger 13 through line 17, is transported to regenerator 19, and enters at or near the upper portion thereof.

As the spent particulate ion exchange material exits exchanger 13 it is relatively wet. Excess water can be removed from the spent material by filtration, centrifugation, drying, or a combination of the foregoing or like expedients. However, the spent material, as it is introduced into the regenerator, need not be dry. As a matter of fact, spent material containing as much as about 60 percent by weight of water can be regenerated satisfactorily. By and large, the maximum desirable water content of the spent particulate ion exchange material upon its introduction into the regenerator is dependent on the process economics for a specific treatment system.

In regenerator 19, the introduced particulate ion exchange material travels first through a preheat zone or stage, next through a heating zone or stage, and then enters a cooling zone or stage. An oxygen-containing gas is introduced into regenerator 19 through line 23 and flows counter current to the direction of flow of the introduced particulate ion exchange material. Gases exit regenerator 19 through vent line 25.

In the preheat zone, heat is transferred to the entering spent ion exchange material by the relatively hotter gases emanating from the heating zone. These gases also volatilize at least some of the water carried by the spent ion exchange material. Also, any ammonia or other volatile material that may be escaping from the heating zone without oxidation is captured by the incoming material and brought back into the heating zone.

In the heating zone, the particulate ion exchange material is maintained at an elevated temperature in the aforementioned range. Heat can be supplied to the particulate ion exchange material in any convenient manner, usually by means of conduction and/or radiation. Suitable heat sources for this purpose are electrical resistance heaters. Gases leaving the heating zone include oxidation products resulting from the oxidation of ammoniacal nitrogen present on the ion exchange material, e.g., nitrogen, water vapor, and possibly carbon dioxide and carbon monoxide if organic matter is present. The gases emanating from the heating zone are relatively hot, and the heat content thereof is used, in part, to preheat the incoming particulate ion exchange material.

Also, at relatively higher ammoniacal nitrogen loadings, e.g., about 50 percent effective cation exchange capacity or more, a substantial amount of heat input for regeneration can be derived from the spent particulate ion exchange medium in that the fuel value of the ammoniacal nitrogen present can be recovered and used to contribute to the maintenance of the temperature in the heating zone of the regenerator. Additionally, a portion of the gases generated during regeneration of the spent particulate material can be recycled and commingled with the incoming oxygen-containing gas as a part of a heat recovery scheme for the regenerator.

The oxygen-containing gas stream can also be air enriched in oxygen content so as to maintain a relatively higher particulate bed temperature in the regenerator at relatively lower levels of ammoniacal nitrogen loading. Similarly, a gaseous fuel may be admixed with the incoming oxygen-containing gas to heat the particulate bed in the regenerator.

Figure 2:
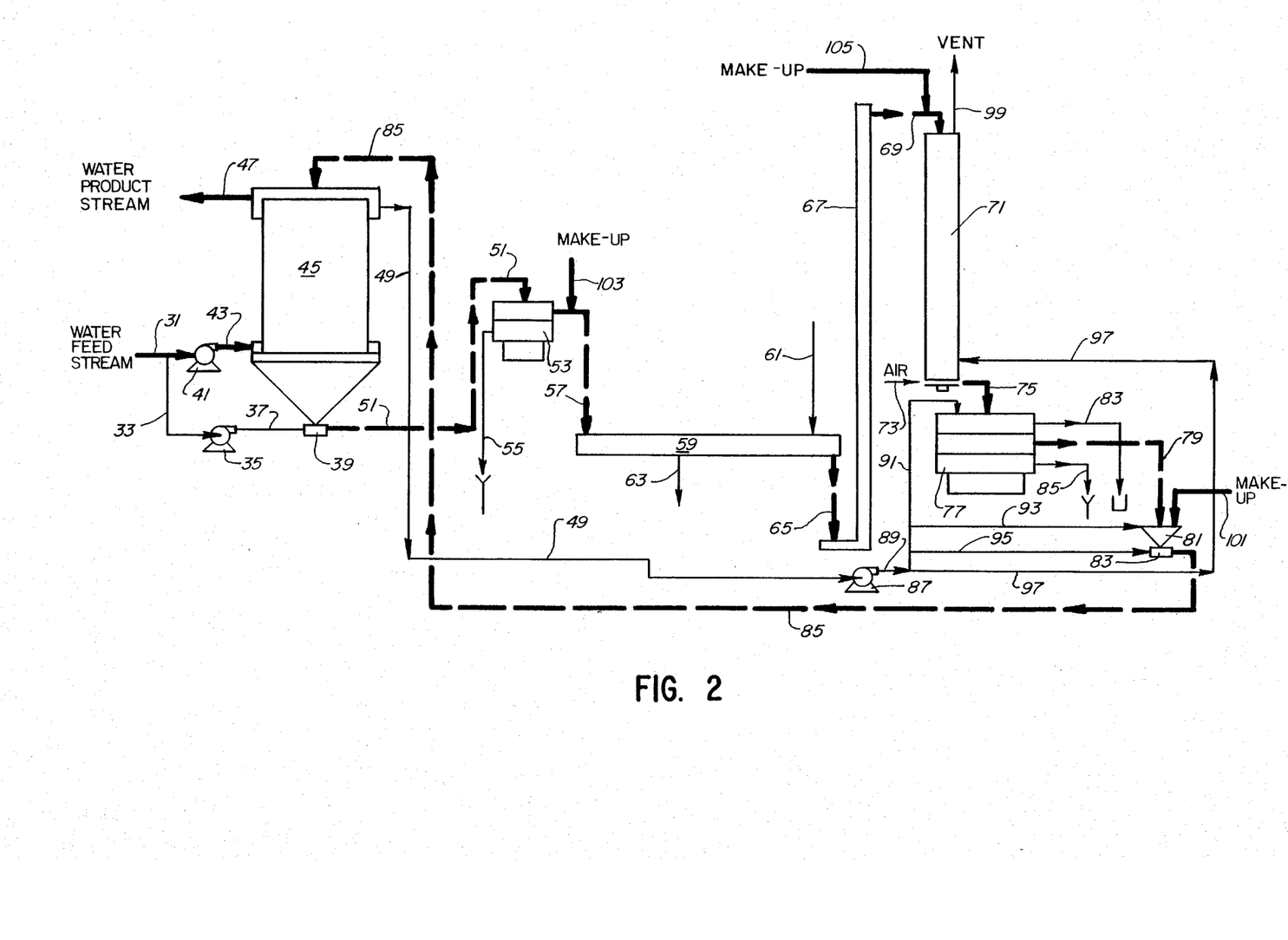
FIG. 2 is a schematic diagram illustrating a typical process embodiment of the present invention.

Another process embodiment is shown in FIG. 2. In this particular embodiment, particulate zeolitic ion exchange material circulates through exchanger 45 and regenerator 71 to effect transfer of ammoniacal nitrogen from a water stream to the particulate containing zeolite ion-exchange material in the exchanger and to effect removal of ammoniacal nitrogen from said particulate material in the regenerator.

A water stream containing ammoniacal nitrogen enters through conduit 31. A major aliquot of that stream is pumped by pump 41 through conduit 43 into exchanger 45. The pumped stream flows upwardly through a downwardly moving bed of particulate ammoniacal nitrogen-sorbing zeolitic ion-exchange material in a counter current flow relationship. A major aliquot of that water stream, depleted in its ammoniacal nitrogen content, exits from the exchanger through conduit 47 as a product. The particulate ammoniacal nitrogen-sorbing zeolite ion-exchange material enriched in sorbed ammoniacal nitrogen is continuously removed from the bottom of the exchanger 45 into a water-driven eductor 39 which is powered with a minor aliquot of the feed water stream from conduit 31 via conduit 33 by means of pump 35 and through conduit 37. A resulting slurry of the particulate material passes through conduit 51 to water separator 53 from which a partially dewatered particulate stream is transferred through conduit 57 to drier 59. Strained water is discarded through conduit 55 to drain. As the relatively wet particulate material passes through drier 59, it is further dewatered by contact with hot gas supplied through conduit 61 and exiting through conduit 63. The resulting, relatively dry particulate material leaves drier 59 through conduit 65 and is transported by means of mechanical conveyor 67 to conduit 69 and therethrough into the top of regenerator 71.

In regenerator 71, the particulate material passes downwardly as a moving bed sequentially through a preheat zone, a heating zone, and a cooling zone. An upwardly flowing, oxygen-containing gas stream is also passed through regenerator 71 and enters via conduit 73. Upwardly flow of gas through the downwardly-moving bed of particles is induced by convection as a result of a chimney effect provided by regenerator 71. Forced draft, utilizing a blower, can also be employed to introduce the oxygen-containing gas into regenerator 71. Alternately, an exhaust blower (not shown) can be provided in vent 99.

A heating zone is established in the midportion of regenerator 71 by electrical resistance heaters arranged therein so that the upwardly flowing oxygen-containing gas and the downwardly moving particulate bed are heated to a temperature in the range of about 350° C. to about 650° C. In this zone ammoniacal nitrogen compounds are removed from the particulate by the action of heat and gaseous oxygen. In the upper region of the regenerator, the preheat zone, the particulate material is preheated by the sensible heat of the hot gases emanating upwardly from the heating zone. Gases exit the preheat zone through vent 99. In the lower region of the regenerator, the cooling zone, the regenerated particulate material is cooled by giving up heat to the oxygen-containing gas passing upwardly therethrough.

In the embodiment shown in FIG. 2, further cooling of the exiting particulate material is effected by a stream of water that enters regenerator 71 via conduit 97. Treated water from exchanger 45 is withdrawn through conduit 49 by pump 87 and passed into conduit 89 to serve several purposes. It is significant that this stream of water has been through exchanger 71 and has been depleted of ammoniacal nitrogen relative to the process feed water entering conduit 31. This treated water is not only advantageously used in part to further cool down the particulate material as it nears the solids discharge end of the regenerator but also to facilitate the removal of fines from the regenerated particulate material as will be discussed below.

The cooled, regenerated particulate material passes from regenerator 71 through conduit 75 into classifier 77 to separate therefrom particulates that have agglomerated to a larger size or that have undergone attrition and have become undesirably small. It is preferred that the regenerated particulate material enters classifier 77 at a temperature of no more than about 100° C. to minimize steam generation in the classifier.

A portion of the stream of water pumped by the aforementioned pump 87 into conduit 89 is diverted through conduit 91 to flush classifier 77 so that the larger-than-desired particulates are discharged through conduit 83 and the smaller-than-desired particulates are discharged through conduit 85. Generally, the amount of particulate material removed in classifier 77, and thus not recirculated to exchanger 45, is less than about 2 percent by weight of the total particulate stream circulating in the system. The regenerated particulate material within the desired size range, e.g., 4×8 Tyler mesh, are transported from classifier 77 through conduit 79 into hopper 81. Additional water from pump 87 through conduits 89, 91, 93 is introduced into hopper 81. From hopper 81, the formed water slurry of regenerated particulate material passes into water eductor 83 which is powered by a stream of water also from pump 87 but passing through conduits 89, 91 and 95. The ejected slurry containing a stream of regenerated particulate material is recycled through conduit 85 to the top of exchanger 45.

The embodiment shown in FIG. 2 also includes locations in the process system for the addition of sufficient make-up of particulate ammoniacal nitrogen sorbing zeolite ion-exchange material to compensate for the rejection or removal of particulate material in classifier 77. These make-up locations are conduits 101, 103 and 105. Preferably, make-up particulate material is introduced via conduit 105 so that the introduced material will be fully conditioned by passage through the regenerator 71 and the classifier 77 prior to entry into exchanger 45.

PROCESS EXAMPLES

The present invention is further illustrated by the following examples.

EXAMPLE 1

Referring to FIG. 1, a water feed stream containing ammoniacal nitrogen at a concentration of 0.44 ppm (expressed as $NH_3$) obtained from the effluent water at a fish rearing station was introduced through conduit 11 into exchanger 13 containing an aliquot of about 8,000 pounds of particulate naturally-occurring mineral clinoptilolite continuously introduced into and withdrawn from exchanger 13. The clinoptilolite was crushed and screened to 4×8 Tyler mesh size. The water feed rate was about 300 gallons per minute. The water flowed upwardly through the bed of particulate containing clinoptilolite in counter current contact mode with respect to the particulate clinoptilolite travelling downwardly in the exchanger as a moving bed. A water product stream was continuously withdrawn from the top of the exchanger through conduit 15 and was observed to have a lowered ammoniacal nitrogen content of 0.22 ppm (as $NH_3$).

The downwardly moving bed of particulate clinoptilolite was continuously taken off at the bottom of the exchanger through conduit 12 at a rate of about 2 pounds of solids per minute. These particulates were observed to have a loading of 270 ppm ammoniacal nitrogen (as $NH_3$) and were next passed into the top of regenerator 19. The regenerator contained at any given time an aliquot of about 4000 pounds of the particulate clinoptilolite moving downwardly therethrough. Regenerated particulate clinoptilolite was removed through conduit 21 at a rate of about 2 pounds per minute and was returned to the top of exchanger 13. The ammoniacal nitrogen-bearing particulates during passage through the regenerator were in counter current flow contact with an upflowing gas stream containing oxygen. This upflow gas stream was an air stream entering the regenerator at a rate of about 0.7 pounds per minute through conduit 23.

Temperature zones were established in the regenerator by multiple electric resistance rod type heaters positioned longitudinally within the regenerator. Heat output of the heaters was 6.34 kilowatts (KW). Heat was transferred from the heaters to the downflowing particulates and upflowing oxygen-containing gas streams. A heating zone was established in the regenerator extending for about the middle one-third length of the regenerator. Temperatures in the heating zone were maintained in the range of about 385° C. to about 430° C. The upper one-third of the regenerator was established as a preheat zone for the downflowing particulate bed by the generated hot gases flowing upwardly from the heating zone. The lower one-third of the regenerator was established as a cool-down or cooling zone for the downflowing particulates leaving the heating zone. As the upflowing air stream which had entered the regenerator at ambient conditions passed upwardly through the cooling zone, heat from the particulates was transferred to the air stream with attendant cooling of the particulates.

The particulates exiting the bottom of the regenerator were observed to have an ammoniacal nitrogen content of 5 ppm (as $NH_3$), and their temperature was observed to be 245° C. At the same time, the gases passing upwardly through the regenerator were vented at the top through conduit 25. No ammonia was detected in that vent gas. This test was continued for more than 15 cycles of the exchanger bed with no apparent reduction in ammoniacal nitrogen removal capacity.

EXAMPLE 2

In a manner similar to Example 1, particulate mordenite, passing through a No. 4 Tyler mesh screen and retained on a No. 8 Tyler mesh screen, is used as the moving bed constituent in the exchanger. Water containing about 1 ppm of ammoniacal nitrogen, expressed as $NH_3$, is passed through the exchanger at a rate of about 300 gallons per minute and exits from the exchanger containing about 0.5 ppm of ammoniacal nitrogen, expressed as $NH_3$.

Particulate mordenite exits the exchanger and enters the regenerator at a loading of about 300 ppm of ammoniacal nitrogen.

Air is used as the oxygen-containing gas at a rate of about 0.75 pounds per minute. Particulate mordenite in the heating zone of the regenerator is maintained at a temperature of about 400° C. and exits the regenerator at a temperature of about 250° C. and having an ammoniacal nitrogen content of about 6 ppm (as $NH_3$). Vent gas exiting from the regenerator has no detectable odor of ammonia. The regenerated particulate mordenite is recirculated to the top of the exchanger.

EXAMPLE 3

In a manner similar to Example 1, particulate erionite, passing through a No. 4 Tyler mesh screen and retained on a No. 8 Tyler mesh screen, is used as the moving bed constituent in the exchanger. Water containing about 1 ppm of ammoniacal nitrogen, expressed as $NH_3$, is passed through the exchanger at a rate of about 300 gallons per minute and exits from the exchanger containing about 0.5 ppm of ammoniacal nitrogen, expressed as $NH_3$.

Particulate erionite exits the exchanger and enters the regenerator at a loading of about 350 ppm of ammoniacal nitrogen, expressed as $NH_3$.

Air is used as the oxygen-containing gas at a rate of about 0.8 pounds per minute. Particulate erionite in the heating zone of the regenerator is maintained at a temperature of about 510° C. and exits the regenerator at a temperature of about 270° C. and having an ammoniacal nitrogen content of about 5 ppm (as $NH_3$). Vent gas exiting from the regenerator has no detectable odor of ammonia. The regenerated particulate erionite is recirculated to the top of the exchanger.

EXAMPLE 4

In a manner similar to Example 1, particulate ferrierite, passing through a No. 4 Tyler mesh screen and retained on a No. 8 Tyler mesh screen, is used as the moving bed constituent in the exchanger. Water containing about 1 ppm of ammoniacal nitrogen, expressed as $NH_3$, is passed through the exchanger at a rate of about 300 gallons per minute and exits from the exchanger containing about 0.5 ppm of ammoniacal nitrogen, expressed as $NH_3$.

Particulate ferrierite exits the exchanger and enters the regenerator at a loading of about 325 ppm of ammoniacal nitrogen, expressed as $NH_3$.

Air is used as the oxygen-containing gas at a rate of about 0.9 pounds per minute. Particulate ferrierite in the heating zone of the regenerator is maintained at a temperature of about 550° C. and exits the regenerator at a temperature of about 280° C. and having an ammoniacal nitrogen content of about 5 ppm (as $NH_3$). Vent gas exiting from the regenerator has no detectable odor of ammonia. The regenerated particulate ferrierite is recirculated to the top of the exchanger.

EXAMPLE 5

In a manner similar to Example 1, particulate zeolite L, agglomerated with a clay binder to particulates in a size range of $\frac{3}{8}''$ to $\frac{1}{2}''$ nominal diameter, is used as the moving bed constituent in the exchanger. Water containing about 1 ppm of ammoniacal nitrogen, expressed as $NH_3$, is passed through the exchanger at a rate of about 300 gallons per minute and exits from the exchanger containing about 0.5 ppm of ammoniacal nitrogen, expressed as $NH_3$.

Particulate zeolite L exits the exchanger and enters the regenerator at a loading of about 250 ppm of ammoniacal nitrogen, expressed as $NH_3$.

Air is used as the oxygen-containing gas at a rate of about 0.7 pounds per minute. Particulate zeolite L in the heating zone of the regenerator is maintained at a temperature of about 425° C. and exits the regenerator at a temperature of about 260° C. and having an ammoniacal nitrogen content of about 5 ppm (as $NH_3$). Vent gas exiting from the regenerator has no detectable odor of ammonia. The regenerated particulate zeolite L is recirculated to the top of the exchanger.

Zeolite L is a synthetically prepared crystalline aluminosilicate zeolite. It is described in Breck, *Zeolite Molecular Sieves,* John Wiley & Sons, New York, N.Y. (1974), p. 156.

EXAMPLE 6

In a manner similar to Example 1, particulate zeolite T, agglomerated with a clay binder to particulates in a size range of ⅜" to ½" nominal diameter, is used as the moving bed constituent in the exchanger. Water containing about 1 ppm of ammoniacal nitrogen, expressed as $NH_3$, is passed through the exchanger at a rate of about 300 gallons per minute and exits from the exchanger containing about 0.5 ppm of ammoniacal nitrogen, expressed as $NH_3$.

Particulate zeolite T exits the exchanger and enters the regenerator at a loading of about 260 ppm of ammoniacal nitrogen, expressed as $NH_3$.

Air is used as the oxygen-containing gas. Particulate zeolite T in the heating zone of the regenerator is maintained at a temperature of about 460° C. and exits the regenerator at a temperature of about 250° C. and having an ammoniacal nitrogen content of about 5 ppm (as $NH_3$). Vent gas exiting from the regenerator has no detectable odor of ammonia. The regenerated particulate zeolite T is recirculated to the top of the exchanger.

Zeolite T is a synthetically prepared crystalline aluminosilicate zeolite. It is described in Breck, *Zeolite Molecular Sieves,* John Wiley & Sons, New York, N.Y. (1974), p. 173.

EXAMPLE 7

The system shown in FIG. 2 is operated to remove ammoniacal nitrogen from a feed water stream using recirculating 4×8 Tyler mesh naturally occurring clinoptilolite particulate. A water product having a relatively lower content of ammoniacal nitrogen useful for fish culture is produced. The Table below shows the process stream compositions.

TABLE

| PROCESS STREAM NO. | COMPOSITION | | | |
|---|---|---|---|---|
| | WATER GPM | AMMONIACAL NITROGEN (as ppm $NH_3$) | PARTICULATE POUNDS/ MINUTE | AIR POUNDS/ MINUTE |
| 31 | 2750 | 1.44 | | |
| 43 | 2650 | 1.44 | | |
| 47 | 2580 | 0.5 | | |
| 37 | 100 | 1.44 | | |
| 51 | 200 | | 20 | |
| 57 | 20 | | 20 | |
| 55 | 197 | | | |
| 99 | 3* | | | |
| 69 | 3* | | 20 | |
| 49 | 70 | | | |
| 75 | | 5 | 20.05 | |
| 63 | 17 | | | |
| 105 | | | 0.05 | |
| 73 | | | | 7 |

*pounds per minute.

As shown in the Table, a feed water stream containing ammoniacal nitrogen is passed into exchanger 45, passing upwardly therethrough and out as a product stream of lowered ammoniacal nitrogen content.

The particulate clinoptilolite, as a down-moving bed, sorbs ammoniacal nitrogen from the counter currently flowing water stream and is discharged from the bottom of exchanger 45. Thence it is passed to dewatering unit 53 and is further dewatered in dryer 59. From the dryer, the clinoptilolite particulate is moved by conveyor 67 to regenerator 71. A relatively small amount (about 0.05 pounds/minute) of 4×8 Tyler mesh size particulate clinoptilolite is added at 105. The particulate passes downwardly through the regenerator as a moving bed through which the counter current gas stream is flowing. Regenerator 71 has electrically-heated rod-type heaters arranged to establish in the regenerator midportion a heating zone extending about one-third of its longitudinal length. The temperature in this heating zone is about 450° C. The up-flowing gas stream emanating upwardly from the heating zone establishes a preheat zone above the heating zone in regenerator 71. The upward flowing gas exiting through vent line 99 has no detectabale odor of ammonia.

The moving bed of particulate clinoptilolite moving downwardly from the heating zone, substantially free of ammoniacal nitrogen, is cooled by transfer of heat to ambient air entering as stream 73 and passing upwardly in a counter current relationship to the movement of the particulate clinoptilolite bed. A stream of water is also introduced into the regenerator cooling zone. Regenerated particulate is recovered from the regenerator, is at a temperature of about 104° C., and is passed to size classifier 77 from which particulates passing through a No. 4 Tyler mesh screen and retained on a No. 8 Tyler mesh screen are transported, by means of water eductor 83, as stream 85 to re-enter exchanger 45.

I claim:

1. A continuous process for removal of ammoniacal nitrogen from water which comprises passing a stream of liquid water containing ammoniacal nitrogen in an ion exchange zone in continuous counter current liquid-solid contact with a stream of particulate, ammoniacal nitrogen-sorbing zeolitic ion exchange material having a substantially uniform particle size for a time period sufficient to produce a treated liquid water stream having a reduced ammoniacal nitrogen content and a stream of ammoniacal nitrogen-enriched particulate zeolitic material;

recovering the stream of ammoniacal nitrogen-enriched particulate zeolitic ion exchange material and passing an oxygen-containing gas stream in continuous counter current contact with the stream of ammoniacal nitrogen-enriched particulate zeolitic ion exchange material in a heating zone while said material is maintained at a temperature of about 350° C. to about 650° C. for a time period sufficient to provide a stream of regenerated, particulate ammoniacal nitrogen sorbing zeolitic ion exchange material having a reduced ammoniacal nitrogen content;

cooling the stream of regenerated particulate zeolitic ion exchange material in a cooling zone to a temperature of less than about 350° C.; and recycling the cooled particulate zeolitic ion exchange material stream to contact said stream of liquid water containing ammoniacal nitrogen.

2. The continuous process in accordance with claim 1 wherein said particulate, ammoniacal nitrogen-sorbing zeolitic ion exchange material is hydrolytically stable to a temperature of at least about 350° C., has a tetravalent oxide-to trivalent oxide ratio of at least about 6, and has a pore size capable of adsorbing oxygen.

3. The continuous process in accordance with claim 1 wherein said particulate, ammoniacal nitrogen-sorbing zeolitic ion exchange material is a naturally-occurring crystalline aluminosilicate which is a member of the group consisting of clinoptilolite, mordenite, erionite and ferrierite.

4. The continuous process in accordance with claim 1 wherein said particulate, ammoniacal nitrogen-sorbing zeolitic ion exchange material is a synthetic crystalline aluminosilicate which is a member of the group consisting of zeolite L, zeolite T, and synthetic mordenite.

5. The continuous process in accordance with claim 1 wherein said particulate, ammoniacal nitrogen-sorbing zeolitic ion exchange material is clinoptilolite.

6. The continuous process in accordance with claim 1 wherein said particulate, ammoniacal nitrogen-sorbing zeolitic ion exchange material is mordenite.

7. The continuous process in accordance with claim 1 wherein said particulate, ammoniacal nitrogen-sorbing zeolitic ion exchange material is erionite.

8. The continuous process in accordance with claim 1 wherein said particulate, ammoniacal nitrogen-sorbing zeolitic ion exchange material is ferrierite.

9. The continuous process in accordance with claim 1 wherein said particulate, ammoniacal nitrogen-sorbing zeolitic ion exchange material is zeolite L.

10. The continuous process in accordance with claim 1 wherein said particulate, ammoniacal nitrogen-sorbing zeolitic ion exchange material is zeolite T.

11. The continuous process in accordance with claim 1 wherein said particulate, ammoniacal nitrogen-sorbing zeolitic ion exchange material is synthetic mordenite.

12. The continuous process in accordance with claim 1 wherein said ammoniacal nitrogen-enriched particulate zeolitic ion exchange material is maintained in the heating zone at a temperature of about 375° C. to about 550° C.

13. The continuous process in accordance with claim 1 wherein said oxygen-containing gas has an oxygen concentration of about 10 percent to about 90 percent by volume.

14. The continuous process in accordance with claim 1 wherein said oxygen-containing gas has an oxygen concentration of about 20 percent by volume.

15. The continuous process in accordance with claim 1 wherein said oxygen-containing gas is air.

16. The continuous process in accordance with claim 1 wherein said ammoniacal nitrogen-enriched particulate zeolitic ion exchange material is heated in said heating zone by conduction and radiation.

17. The continuous process in accordance with claim 16 wherein the heating is effected by an electrical resistance heater.

18. The continuous process in accordance with claim 1 wherein said ammoniacal nitrogen-enriched particulate zeolitic ion exchange material is heated in said heating zone by a relatively hotter gas stream.

19. The continuous process in accordance with claim 18 wherein a portion of heat input to said ion exchange material is derived from combustion of the ammoniacal nitrogen present.

20. The continuous process in accordance with claim 1 wherein the recovered stream of ammoniacal nitrogen-enriched particulate zeolitic ion exchange material is preheated prior to the heating zone.

21. The continuous process in accordance with claim 20 wherein the preheating is effected by means of a relatively hotter gas stream and with attendant volatilization of water from said material.

22. The continuous process in accordance with claim 1 wherein a stream of gases emanating from said heating zone is passed in continuous counter current contact with said stream of ammoniacal nitrogen-enriched particulate zeolitic ion exchange material prior to the heating zone.

23. The continuous process in accordance with claim 1 wherein the cooling is effected by passing said oxygen-containing gas stream in continuous counter current contact with the regenerated particulate zeolitic ion exchange material exiting from the heating zone.

24. The continuous process in accordance with claim 1 wherein the regenerated ammoniacal nitrogen-sorbing particulate zeolitic ion exchange material is classified according to particle size prior to recycling, particulate material of substantially the same particle size as the particulate material in contact with the stream of liquid water containing ammoniacal nitrogen is recovered, and only the recovered particulate material is recycled.

25. The continuous process in accordance with claim 1 wherein a substantially uniform concentration of particulate, ammoniacal nitrogen-sorbing zeolitic ion exchange materials is maintained in the ion exchange stage by adding a make-up stream of said particulate, ammoniacal nitrogen-sorbing zeolitic ion exchange materials.

26. The continuous process in accordance with claim 25 wherein the make-up stream is added to the recovered ammoniacal nitrogen-enriched particulate zeolitic ion exchange material stream.

27. The continuous process in accordance with claim 25 wherein the make-up stream is added to the cooled particulate zeolitic ion exchange material stream being recycled.

28. The continuous process in accordance wth claim 1 wherein said particulate, ammoniacal nitrogen-sorbing zeolitic ion exchange material in the ion exchange zone has a particle size that passes through a No. 4 Tyler mesh screen and is retained on a No. 8 Tyler mesh screen.

29. The continuous process in accordance with claim 1 wherein said particulate, ammoniacal nitrogen-sorbing zeolitic ion exchange material in the ion exchange zone has a particle size of about 1 mm to about 15 mm.

30. The continuous process in accordance with claim 1 wherein an aliquot of the treated liquid water stream is combined with the regenerated, particulate ammoniacal nitrogen-sorbing zeolitic ion exchange material stream prior to recycling.

31. The continuous process in accordance with claim 30 wherein a portion of said aliquot is combined with said regenerated material in the cooling zone.

32. A continuous process for decreasing ammoniacal nitrogen content in water which comprises the steps of
circulating continuously a particulate moving bed of an ammoniacal nitrogen-sorbing zeolite sequentially through an ion exchange zone and a regeneration zone;
passing a stream of liquid water containing ammoniacal nitrogen in the ion exchange zone counter current to said particulate moving bed and at a rate providing liquid-solid contact between the liquid water stream and the moving bed sufficient to remove at least a portion of the ammoniacal nitrogen present in said liquid water stream and to produce a spent moving bed portion enriched in ammoniacal nitrogen; and
subjecting said spent moving bed portion in the regeneration zone to a temperature of about 350° C. to about 650° C. in the presence of an oxygen-containing gas stream moving in a direction counter current to the movement of said spent moving bed portion for a time period sufficient to remove at least a portion of the ammoniacal nitrogen present in said spent moving bed portion.

33. The continuous process in accordance with claim 32 wherein said spent moving bed is preheated prior to regeneration by gases emanating from the regeneration zone.

34. The continuous process in accordance with claim 32 wherein said spent moving bed portion in the regeneration zone is subjected to a temperature of about 375° C. to about 550° C.

35. The continuous process in accordance with claim 32 wherein the zeolite is clinoptilolite.

36. The continuous process in accordance with claim 32 wherein the oxygen-containing gas is air.

37. The continuous process in accordance with claim 32 wherein the particulate moving bed has a particle size passing through a No. 4 Tyler mesh screen and is retained on a No. 8 Tyler mesh screen.

38. A process for continuous regeneration of a particulate, zeolitic ion exchange material bearing ammoniacal nitrogen which comprises the steps of
forming a moving stream of said particulate material defining a preheating zone and a heating zone;
passing a stream of an oxygen-containing gas through said heating zone in a direction counter current to the direction of movement of said moving stream;
maintaining said particulate material in said heating zone at a temperature of about 350° C. to about 650° C. while said oxygen-containing gas is passed therethrough; and
passing gases emanating from said heating zone through said preheating zone in a direction counter current to the direction of movement of said moving stream.

39. The regeneration process in accordance wth claim 38 wherein the particulate material is maintained at a temperature of about 375° C. to about 550° C. in said heating zone.

40. The regeneration process in accordance with claim 38 wherein the oxygen-containing gas has an oxygen concentration of about 10 percent to about 90 percent by volume.

41. The regeneration process in accordance with claim 38 wherein the oxygen-containing gas is air.

* * * * *